US011422921B2

(12) United States Patent
Karuppiah et al.

(10) Patent No.: US 11,422,921 B2
(45) Date of Patent: Aug. 23, 2022

(54) DEBUG SYSTEMS FOR DETERMINISTIC VALIDATION OF DATA STORAGE DEVICES

(71) Applicant: Western Digital Technologies, Inc., San Jose, CA (US)

(72) Inventors: Muthukumar Karuppiah, San Ramon, CA (US); Rohit Sindhu, San Jose, CA (US); Dinesh Nalli, Cupertino, CA (US); Khurram Ismail, Milpitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 360 days.

(21) Appl. No.: 16/731,787

(22) Filed: Dec. 31, 2019

(65) Prior Publication Data

US 2021/0200661 A1 Jul. 1, 2021

(51) Int. Cl.
*G06F 11/00* (2006.01)
*G06F 11/36* (2006.01)
*G06F 3/06* (2006.01)

(52) U.S. Cl.
CPC .......... *G06F 11/366* (2013.01); *G06F 3/0619* (2013.01); *G06F 3/0653* (2013.01); *G06F 3/0673* (2013.01)

(58) Field of Classification Search
CPC .... G06F 11/366; G06F 3/0619; G06F 3/0653; G06F 11/3648
See application file for complete search history.

(56) References Cited

U.S. PATENT DOCUMENTS

| 8,683,265 | B2 | 3/2014 | Rentschler et al. |
| 8,966,319 | B2 | 2/2015 | Fai et al. |
| 8,996,744 | B1* | 3/2015 | Marr ................. H04L 67/10 713/193 |
| 9,053,233 | B2 | 6/2015 | Moyer |
| 9,430,412 | B2* | 8/2016 | Huang ............ G06F 15/17337 |
| 10,089,212 | B2 | 10/2018 | Iwai |
| 10,698,844 | B1* | 6/2020 | Wigmore ........... G06F 13/1668 |
| 2013/0198311 | A1* | 8/2013 | Tamir .................. G06F 3/0688 709/212 |

(Continued)

*Primary Examiner* — Amine Riad
(74) *Attorney, Agent, or Firm* — Ravi Mohan; Rutan & Tucker, LLP

(57) ABSTRACT

Systems and methods are disclosed for deterministically validating an SSD device, based on the occurrence of a triggering firmware event. In some implementations, a method is provided. The method comprising receiving an ID of a triggering firmware event from a computing device and receiving data of a cross feature event from the computing device. A storage device may execute a plurality of NVMe commands as part of a test to generate a plurality of firmware events. An ID of each of the plurality of firmware events is compared to the ID of the triggering firmware event and in response to an ID of one of the plurality of firmware events matching the ID of the triggering firmware event, the one of the plurality of firmware events may be identified as the triggering firmware event and an indication of the match may be generated. At least part of the data of the cross feature event is transmitted to the storage device to cause execution of the cross feature event during execution of the triggering firmware event.

20 Claims, 7 Drawing Sheets

(56) References Cited

U.S. PATENT DOCUMENTS

| | | | |
|---|---|---|---|
| 2014/0281040 A1* | 9/2014 | Liu | G06F 13/16 |
| | | | 710/3 |
| 2015/0082325 A1 | 3/2015 | Aharonov et al. | |
| 2016/0357698 A1* | 12/2016 | Huang | G06F 13/4068 |
| 2017/0149920 A1* | 5/2017 | Sammatshetti | G06F 3/061 |
| 2018/0314451 A1* | 11/2018 | Ellison | G06F 9/4493 |
| 2018/0349026 A1* | 12/2018 | Richter | G06F 13/1668 |
| 2019/0004975 A1* | 1/2019 | Benisty | G06F 12/0246 |
| 2019/0129774 A1* | 5/2019 | Konan | G06F 11/3476 |
| 2019/0146684 A1* | 5/2019 | Benisty | G06F 3/0659 |
| | | | 711/102 |
| 2019/0187909 A1* | 6/2019 | Pinto | G06F 3/0683 |
| 2019/0187928 A1* | 6/2019 | Agarwal | G06F 3/0619 |
| 2019/0266111 A1* | 8/2019 | Yeo | G06F 13/1668 |
| 2020/0142621 A1* | 5/2020 | Bae | G06F 3/061 |
| 2020/0250346 A1* | 8/2020 | Sasidharan | G06F 21/46 |
| 2020/0319812 A1* | 10/2020 | He | G06F 3/0604 |
| 2020/0326868 A1* | 10/2020 | Yang | G06F 13/1668 |
| 2021/0064745 A1* | 3/2021 | Bouguerra | G06N 3/063 |
| 2021/0286553 A1* | 9/2021 | Moiseyenko | G06F 11/14 |
| 2022/0050747 A1* | 2/2022 | Sehgal | G06F 11/076 |

* cited by examiner

DEBUG SYSTEMS FOR DETERMINISTIC VALIDATION OF DATA STORAGE DEVICES

BACKGROUND

Field of the Disclosure

This disclosure relates to data storage devices. More particularly, the disclosure relates to a deterministic debug infrastructure for validation of solid state drives (SSDs).

Description of the Related Art

Data storage devices may be used to store data used by computing devices. For example, a computing device may read or access data that is stored on the data storage device (e.g., read a file or other data object). In another example, a computing device may write data to or store data on a data storage device. In validating a data storage device, it is important to evaluate data integrity and operation of the storage device deterministically. Reproducing and studying certain real-world scenarios related to data storage device operation while a firmware event is in progress enables a designer of a data storage device to obtain more complete testing and validation coverage.

SUMMARY

In some implementations, the present disclosure relates to a method, the method comprising receiving an identifier (ID) of a triggering firmware event from a computing device and receiving data of a cross feature event from the computing device. The computing device may transmit a plurality of non-volatile memory express (NVMe) commands to a storage device as part of a test of the storage device, and execution of the commands by the storage device may generate a plurality of firmware events. The method further includes comparing an ID of each of the plurality of firmware events to the ID of the triggering firmware event and in response to an ID of one of the plurality of firmware events matching the ID of the triggering firmware event, identifying the one of the plurality of firmware events as the triggering firmware event and generating an indication of the match. The method further includes transmitting at least part of the data of the cross feature event to the storage device to cause execution of the cross feature event during execution of the triggering firmware event in response to the indication of the match.

In some implementations, the present disclosure relates to an apparatus having a first interface to communicate with a computing device, a second interface to communicate with a storage device, and a processing device to: receive an ID of a triggering firmware event from the computing device and receive data of a cross feature event from the computing device. The computing device may transmit a plurality of NVMe commands to the storage device as part of a test of the storage device, and execution of the commands by the storage device may generate a plurality of firmware events. The processing device may further compare an ID of each of the plurality of firmware events to the ID of the triggering firmware event and in response to an ID of one of the plurality of firmware events matching the ID of the triggering firmware event, the processing device may identify the one of the plurality of firmware events as the triggering firmware event and generate an indication of the match. In response to the indication of the match, the processing device may transmit at least part of the data of the cross feature event to the storage device to cause execution of the cross feature event during execution of the triggering firmware event.

In some implementations, the present disclosure relates to a non-transitory computer readable medium having instructions stored thereon that, when executed by a processing device, cause the processing device to: receive an ID of a triggering firmware event from the computing device and receive data of a cross feature event from the computing device. The computing device may transmit a plurality of NVMe commands to the storage device as part of a test of the storage device, and execution of the commands by the storage device may generate a plurality of firmware events. The processing device may further compare an ID of each of the plurality of firmware events to the ID of the triggering firmware event and in response to an ID of one of the plurality of firmware events matching the ID of the triggering firmware event, the processing device may identify the one of the plurality of firmware events as the triggering firmware event and generate an indication of the match. In response to the indication of the match, the processing device may transmit at least part of the data of the cross feature event to the storage device to cause execution of the cross feature event during execution of the triggering firmware event.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
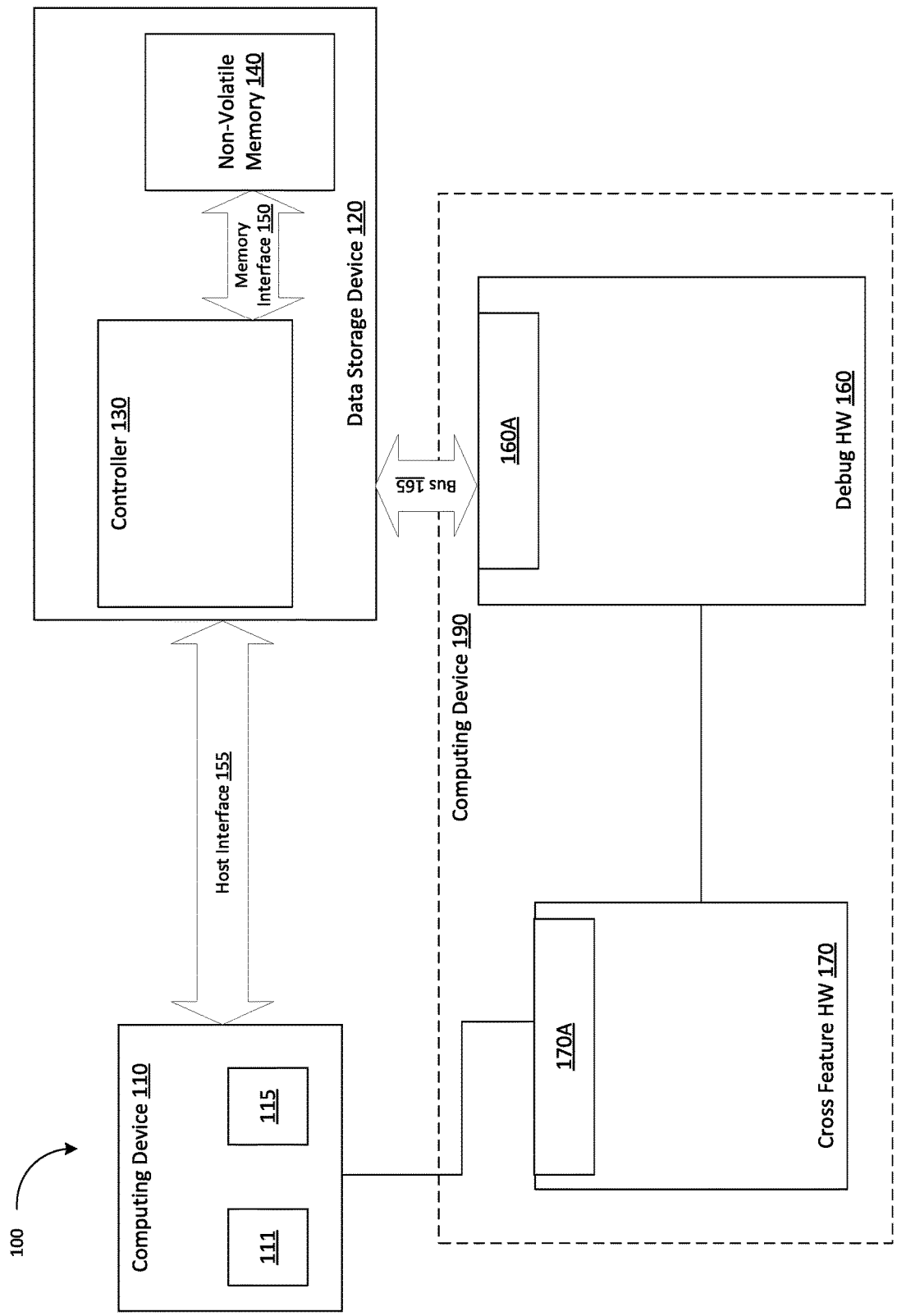
FIG. 1A is a block diagram illustrating an example SSD validation system, in accordance with one or more embodiments of the present disclosure.

In the following disclosure, reference is made to examples, implementations, and/or embodiments of the disclosure. However, it should be understood that the disclosure is not limited to specific described examples, implementations, and/or embodiments. Any combination of the features, functions, operations, components, modules, etc., disclosed herein, whether related to different embodiments or not, may be used to implement and practice the disclosure. Furthermore, although embodiments of the disclosure may provide advantages and/or benefits over other possible solutions, whether or not a particular advantage and/or benefit is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in the claim(s).

The headings provided herein are for convenience only and do not necessarily affect the scope or meaning of the claimed invention. Disclosed herein are example systems, implementations, configurations, and/or embodiments relating to deterministically validating the operation and data integrity of data storage devices. For simplicity of description, the description below and associated figures will use solid state drive (SSD) as a non-limiting example. More generally, the various embodiments disclosed can be applied to various types of data storage and/or memory devices as described further below.

Data storage devices, such as SSDs typically include one or more controllers coupled with one or more non-volatile memory (NVM) arrays. Data stored on such memory arrays may be subject to loss and/or corruption. For example, data may be lost, damaged, corrupted, etc., due to failure of memory cells, damage (e.g., physical damage), degradation, read/write disturbs, loss of data retention, loss of endurance, etc. Therefore, validation of an SSD is a crucial step in its design. When validating SSDs, it is important to evaluate data integrity and functionality when the operation of the SSD (e.g., processing of an NVMe command or firmware event thereof) is suddenly interrupted by a cross feature event (e.g., execution of a reset or another NVMe command). For example, data integrity of an SSD must be evaluated when the SSD suffers a sudden reset in real operation scenarios, such as when the storage device is in the middle of processing an NVMe command, such as an input/output (I/O) command or an administrative command. Deterministically performing resets while the SSD is processing an NVMe command helps reproduce and study real world scenarios where artifacts and glitches may occur. It is also important to evaluate the operation of the storage device when the processing of an I/O command or an administrative command by the SSD is interrupted by another NVMe command. Deterministically processing an NVMe command based on, e.g., the occurrence of a firmware event (i.e., while the firmware of the SSD is in a particular state) helps reproduce and study certain real-world scenarios related to I/O or administrative command behavior while a firmware event is already in progress. Therefore, deterministic (e.g., in response to a triggering firmware event) validation of SSDs allows for the greatest level of firmware test coverage.

However, validation of SSDs is currently performed on a statistical (e.g., random) basis, through random injection of commands for example. Because of this, a large amount of firmware test coverage is missing from current validation solutions. Deterministic validation solutions are difficult to implement because they require the injection of interrupting commands within microseconds of a triggering firmware event, must process an interrupting command within microseconds of the triggering firmware event, are costly in terms of testing and validation infrastructure, have limited automation capability for large scale deployment, are complex to implement, and do not optimize lab space utilization.

FIG. 1A is a diagram illustrating an example SSD validation system 100, in accordance with some embodiments of the present disclosure. The SSD validation system 100 includes a computing device 110, cross feature hardware 170, debug hardware 160, and a data storage device 120. The computing device 110 may also be referred to as a host device. The computing device 110 includes a processing device 111 and a random access memory (RAM) 115. The processing device 111 may be one or more devices that execute instructions (e.g., executes machine instructions, code, machine code, etc.). Examples of a processing device may include, but are not limited to a controller, a system-on-a-chip (SoC), a field-programmable gate array (FPGA), an application-specific integrated circuit (ASIC), a central processing unit (CPU), a processor, a multi-core processor, a graphics processing unit (GPU), etc. The RAM 115 may be a volatile memory that stores data that may be used by the processing device 111. A volatile memory may be a memory (or other device that stores data and allows access to the data) that does not retain the data when power is not provided to the volatile memory (e.g., when power is turned off).

The computing device 110 may be a device that may execute services, processes, applications, apps, instructions, etc., to perform one or more operations. Examples of computing devices include, but are not limited to, phones (e.g., smart phones, cellular phones, etc.), cable set-top boxes, smart televisions (TVs), video game consoles, laptop computers, tablet computers, desktop computers, server computers, personal digital assistances, wearable devices (e.g., smart watches), media players, cameras, and/or other types of electronic devices. The computing device may also be referred to as a host system. The computing device 110 may be coupled to one or more networks and/or other computing devices via the one or more networks. A network (not illustrated in the figures) may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

In one embodiment, the data storage device 120 may be part of the computing device 110 (e.g., may be located inside of a housing, chassis, case, etc., of the computing device 110). In another embodiment, the data storage device 120 may be separate from the computing device 110 (e.g., may be an external device that is coupled to the computing device 110 via a cable, such as a universal serial bus (USB) cable) for example.

The data storage device 120 may incorporate access command scheduling and/or execution in accordance with embodiments, examples, and/or implementations disclosed herein. The data storage device 120 may be any type of data storage device, drive, module, component, system, or the like. Furthermore, the terms "drive" and "data storage drive" may be used herein in certain contexts to refer to any type of data storage device, and may be used substantially interchangeably with the term "data storage device" herein in connection with various embodiments and/or in various contexts. As shown, the data storage device 120 (e.g., hybrid hard drive, solid-state drive, any storage device utilizing solid-state memory, a hard disk drive, any storage device utilizing magnetic media/medium, etc.) includes a controller 130 (e.g., control circuitry, software, firmware, or a combination thereof) and anon-volatile memory 140.

The non-volatile memory (NVM) 140 may be configured for long-term storage of data and may retain data between power on/off cycles of the data storage device 120. The non-volatile memory 140 and/or portions of the non-volatile memory 140 may also be referred to as a storage medium. In some embodiments, the non-volatile memory 140 may include solid-state memory. Solid-state memory may comprise a wide variety of technologies, such as flash integrated circuits, Phase Change Memory (PC-RAM, PCM, or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, triple level cell (TLC) memory, X4 or quad-level cell (QLC) memory, etc.), NOR memory, EEPROM, Ferroelectric Memory (Fe-RAM), magnetoresistive RAM (MRAM), or other discrete solid-state memory chips. In some embodiments, non-volatile memory 140 may comprise NAND flash memory having a certain access time for a unit of data, while in other embodiments non-volatile memory 140 may comprise fast NAND flash or storage class memory (SCM a.k.a. persistent memory), which has a faster access time for a unit of data than NAND flash memory. In other embodiments, non-volatile memory may be a hybrid memory comprising both NAND flash memory and fast NAND flash or SCM. The non-volatile memory 140 may include any combination of the one or more types of memories described here. The non-volatile memory 140 may be divided logically and/or physically into arrays, planes, blocks, pages, tracks, and sectors. If the data storage device 120 is a hard disk drive, the non-volatile memory 140 may include magnetic recording heads coupled with rotating magnetic media.

The controller 130 may include one or more processors, memory devices, data and/or power transmission channels/paths, boards, or the like. In some embodiments, the controller 130 may be implemented as one or more system-on-a-chip (SoC) modules, field-programmable gate array (FPGA) modules, application-specific integrated circuit (ASIC) modules, processing devices (e.g., processors), chips, or the like. In other embodiments, one or more components of the controller 130 may be mounted on a printed circuit board (PCB). The controller 130 may be configured to receive commands (e.g., NVMe commands) from a storage interface (e.g., a device driver) residing on the computing device 110.

The controller 130 may communicate with the computing device 110 over a host interface 155, and may receive commands via the host interface 155. The host interface may be a PCIe/NVMe interface. These commands may be referred to as NVMe commands, data commands, data access commands, data storage access commands, etc. NVMe commands may specify a block address in the data storage device 120. Data may be accessed/transferred based on such commands. For example, the controller 130 may receive NVMe commands (from the computing device 110) and may execute such commands on/in the non-volatile memory 140 (e.g., in one or more arrays, pages, blocks, sectors, etc.). The NVMe commands received from computing device 110 may include read data commands, write data commands, and erase data commands. The controller 130 may be coupled to the non-volatile memory (NVM) 140 via a memory interface 150. In one embodiment, the memory interface 150 may include a plurality of channels (e.g., one or more lines, pines, wires, traces, etc.) and each channel may be coupled to different portions of the non-volatile memory 140 (e.g., different NVM arrays, different flash arrays, etc.).

The controller 130 may execute the received NVMe commands to read, write, and erase data from non-volatile memory 140, via the memory interface 150. For example, the NVMe commands may include a read command (e.g., a data read command) to read a block of data from the non-volatile memory 140. The controller 130 may read the data from the page and may transmit the data to the computing device 110 via the host interface 155. In another example, the commands may include a write command (e.g., a data write command) to write data to a page in a non-volatile memory 140. In one embodiment, write commands may include program commands (e.g., a command to write the value "1" to a location the non-volatile memory 140) and erase commands (e.g., a command to write the value "0" to a location, a page, a block, etc., in the non-volatile memory array). The controller 130 may receive the data from the computing device 110 via the host interface 155 and may write the data to the page. The host interface 155 may include hardware (e.g., wires, pins, traces, connectors, etc.), software (e.g., drivers), firmware, or a combination thereof, that allows the processing device 111 and/or the computing device 110 to communicate data with the data storage device 120. Examples of a host interface may include a peripheral component interconnect express (PCIe) bus, a serial AT attachment (SATA) bus, a serial attached SCSI (SAS), a non-volatile memory express (NVMe) bus, etc. As the data storage device 120 executes commands such as NVMe commands, it may generate firmware events. A FW event 180 may be any operation that modifies the non-volatile memory 140, such as a user data write operation, certain read operations, a controller data write operation, a statistics operation, or a log operation, for example.

The data storage device 120 may store data received from the computing device 110 such that the data storage device 120 acts as data storage for the computing device 110. To facilitate this function, the controller 130 may implement a logical interface. The logical interface may present to the computing device 110 memory a set of logical addresses (e.g., sequential/contiguous addresses) where data may be stored. Internally, the controller 130 may map logical addresses to various physical memory addresses in the non-volatile memory arrays and/or other memory module(s) using a logical to physical mapping table. Mapping data indicating the mapping of logical addresses to physical memory addresses may be maintained in the data storage device 120. For example, mapping table data may be stored in non-volatile memory 140 in order to allow for recreation or recovery of mapping tables following a power cycle.

The controller 130 may encode data when storing the data on the non-volatile memory 140. The controller 130 may encode the data to protect the data from errors, loss, corruption, etc. The controller 130 may protect the data from errors, loss, corruption, etc., using various methods, techniques, functions, operations, actions, etc. In one embodiment, the controller 130 may protect the data by generating parity data (e.g., parity bits). The parity data may allow the controller 130 to determine whether there are errors in the data (e.g., errors due to corruption, damaged cells, damaged blocks, error while reading the data, etc.). The parity data (e.g., one or more parity bits) may be generated using various algorithms, techniques, functions, operations, etc. In another embodiment, the controller 130 may use an ECC to generate codewords. The codewords may also allow the controller 130 (e.g., a decoder—not shown in the Figures) to correct or recover from errors in the codewords.

The controller 130 may also decode data that is stored on the non-volatile memory 140. In one embodiment, the decoder may decode codewords which encode the data that is stored on the non-volatile memory 140. In another embodiment, the decoder may perform error detection to determine the integrity of data retrieved from non-volatile memory 140 (e.g., to determine whether the data has errors). For example, the decoder may use parity data to check the data to determine whether there is an error in the data (e.g., whether one or more bits in the data are incorrect due to corruption, damage cells, damaged blocks, etc.).

The debug hardware (HW) 160 may be a computing device comprising one or more processors, memory devices, data and/or power transmission channels/paths, boards, or the like. In some embodiments, the debug HW 160 may be implemented as one or more system-on-a-chip (SoC) modules, field-programmable gate array (FPGA) modules, application-specific integrated circuit (ASIC) modules, processing devices (e.g., processors), chips, or the like. In other embodiments, one or more components of the debug HW 160 may be mounted on a printed circuit board (PCB). One or more memory devices of the debug HW 160 may comprise a controller read-only memory and/or a controller volatile memory (e.g., DRAM) in which the ID of a triggering firmware (FW) event may be stored along with firmware (FW) events written by the data storage device 120, as discussed in further detail herein. The debug HW 160 may be configured to receive a stream of FW events from the data storage device 120 and compare a FW event ID of each FW event to the ID of the triggering FW event. In response to detecting a match, the debug HW 160 may transmit a general purpose input/output (GPIO) signal to the cross feature hardware 170, as discussed in further detail herein. The debug HW 160 may be coupled to the data storage device 120 via bus 165. The debug HW 160 may include an interface 160A, through which the debug HW 160 may communicate on the bus 165. The interface 160A may comprise any appropriate type of interface such as a PCIe interface, universal serial bus (USB) interface, NVME interface, or SATA interface, for example. Although illustrated as connected to computing device 110 and storage device 120 separately, debug HW 160 and cross feature hardware 170 (whether implemented separately or together as computing device 190) may be connected to both computing device 110 and storage device 120 via the host interface 155 without a separate connection to each.

The cross feature hardware (HW) 170 (hereinafter "HW 170" or "cross feature HW") may be a computing device comprising one or more processors, memory devices, data and/or power transmission channels/paths, boards, or the like. In some embodiments, the HW 170 may be implemented as one or more system-on-a-chip (SoC) modules, field-programmable gate array (FPGA) modules, application-specific integrated circuit (ASIC) modules, processing devices (e.g., processors), chips, or the like. One or more memory devices of the HW 170 may comprise a controller read-only memory and/or a controller volatile memory (e.g., DRAM) in which data of a cross feature event may be written, as discussed in further detail herein. The HW 170 may be configured with data of a cross feature event by computing device 110. The HW 170 may be coupled to the computing device 110 via any appropriate communication link (e.g., PCIe, USB). The HW 170 may include an interface 170A, through which the HW 170 may communicate on the communication link. The interface 170A may comprise any appropriate type of interface such as a PCIe interface, universal serial bus (USB) interface, NVME interface, or SATA interface, for example. The cross feature HW 170 may be configured to receive a GPIO signal from the debug HW 160 indicating that a FW event having an ID matching the ID of a triggering event has occurred. In response to receiving the GPIO signal, HW 170 may transmit at least a portion of the cross feature event data to the data storage device 120 to cause execution of the cross feature event during the triggering event, as discussed in further detail herein. Each of the computing device 110, HW 170, debug HW 160, and data storage device 120 may include software or logic stored in the memory thereof that may be executed by a processing device thereof to perform one or more of the functions described herein. In some embodiments, the functions of the HW 170 and the debug HW 160 may be implemented together as a single computing device 190.

Figure 1B:
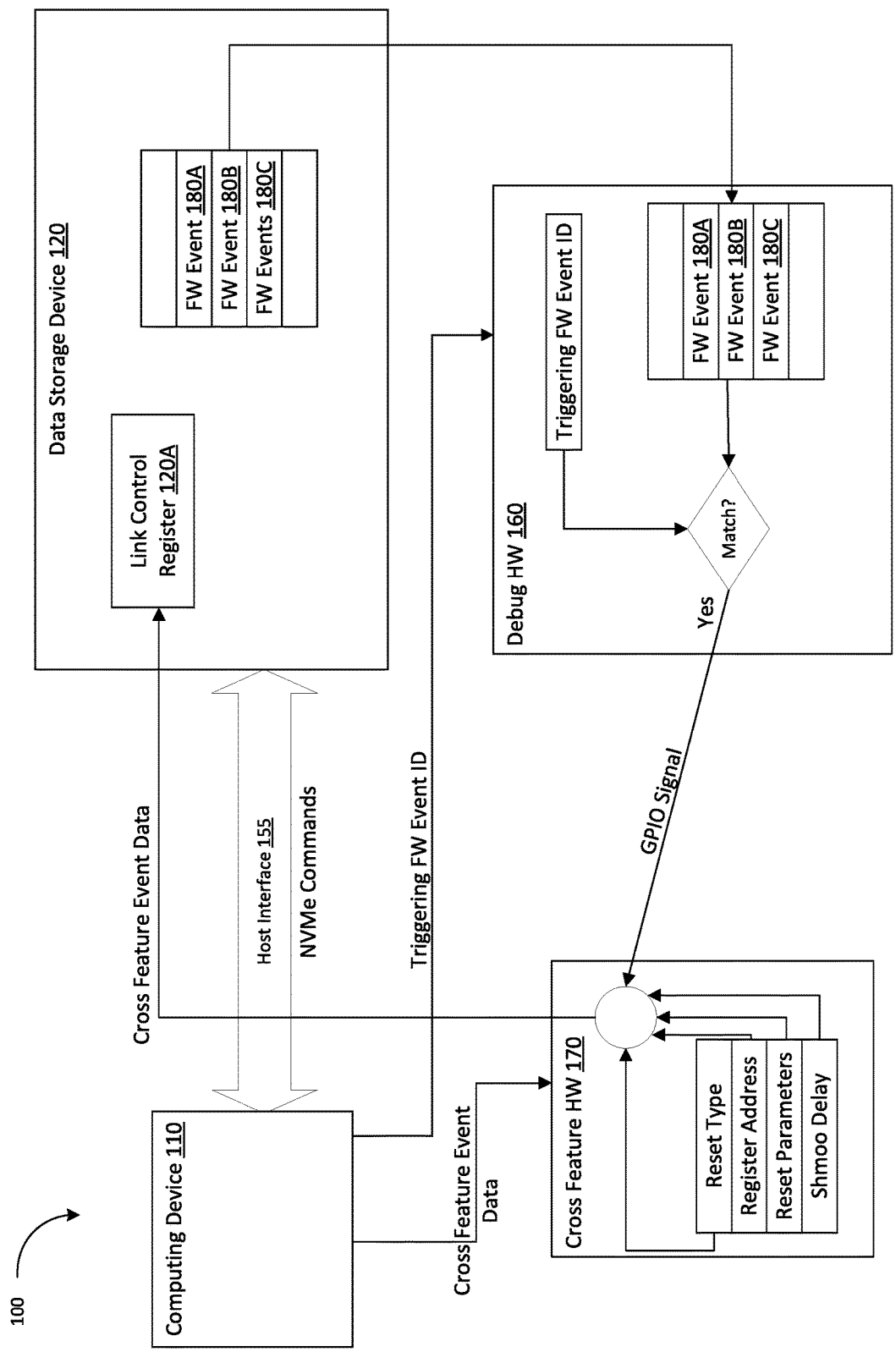
FIG. 1B is a block diagram illustrating the example SSD validation system of FIG. 1A, in accordance with one or more embodiments of the present disclosure.

FIG. 1B illustrates the SSD validation system 100 in accordance with some embodiments of the present disclosure. As discussed above, cross feature injection may refer to the deterministic injection of a cross feature event such as a reset to the data storage device 120 while some other command (or, a triggering FW event thereof) is in progress. To perform such injection deterministically, it is desirable to insert a reset within a certain span of time within the triggering FW event. The computing device 110 may configure the HW 170 with cross feature event data, which may include data to trigger execution of the cross feature event, and may configure the debug HW 160 with the ID of the triggering FW event. The triggering FW event ID may comprise an N bit ID which may be a compressed version of the file and function and line number ID for the file(s) where the event is originating from within the firmware source file. For example, if the triggering firmware event is a write, then during the write, there should not be any corruption or malfunction due to the high priority action of the cross feature event executed by the cross feature HW 170. Thus, the ID of the triggering FW event may also include write points where the cross feature event can be executed without corrupting the write. In the example of FIG. 1B, the cross feature event may be a reset.

More specifically, the computing device 110 may transmit the ID of the triggering FW event to the debug HW 160. The triggering FW event may be any FW event (e.g., a user data write operation, certain read operations, a controller data write operation) whose execution the host wishes to interrupt with execution of a cross feature event so as to monitor the effects of such interruption. In addition, the computing device 110 may configure the HW 170 with cross feature event data to trigger execution of the reset. The cross feature event data may include the reset type, the register address of a link control register 120A on the data storage device 120, any reset parameters necessary, and (optionally) a shmoo delay parameter. The reset type may correspond to a non-volatile memory reset, a conventional PCI reset (e.g., warm reset or hot reset), a PCI link or downstream port reset, a PCI function level reset, or a controller reset, for example. The link control register 120A may correspond to a register in the configuration space of controller 130 where the reset data may be transmitted. The link control register 120A may include a set of bits for each reset type (not shown). For certain reset types (e.g., FLR, link, controller resets), the set of bits may include a single bit (e.g., "1" or "0"; "enable" or "disable") and the reset parameters for these types may include a "1" or an "enable" value to indicate that this reset type should be activated. For other reset types, the set of bits may include multiple bits as these reset types may require additional information. For example, the set of bits for a warm reset may include a bit for high/low values as well as one or more bits to indicate a length of time the signal should be high. Thus, the reset parameters for a warm reset may include a "high" value (indicating signal high) to activate the warm reset as well as a value to indicate how long the signal should be "high."

By configuring the HW 170 in this way, the computing device 110 may also put the HW 170 into a GPIO monitoring mode, wherein it will monitor for a GPIO signal, and write at least part of the data of the cross feature event into the link control register 120A in response to receiving the GPIO signal.

In some embodiments, the host (computing device 110) may wish to observe the effect of a sudden reset at multiple points throughout the execution of the triggering FW event. Thus, the computing device 110 may include as part of the cross feature event data, a shmoo delay parameter, which may be defined as one or more periods (e.g., 10 microseconds (us), 20 us, 30 us) by which execution of the cross feature event may be delayed during the execution of the triggering FW event. Thus, when the shmoo delay parameter is included with the cross feature event data, the storage device 120 may repeat execution of the triggering FW event for each delay period indicated in the shmoo delay parameters, each time executing the reset during the triggering FW event but after a different delay period. The host may select the delay periods such that a thorough range of test coverage is obtained. The host may accomplish this by selecting the delay periods in any appropriate way. For example, the host may select delay periods randomly, to target certain instructions of the triggering FW event, or in ascending order by particular increments, for example.

Figure 2:
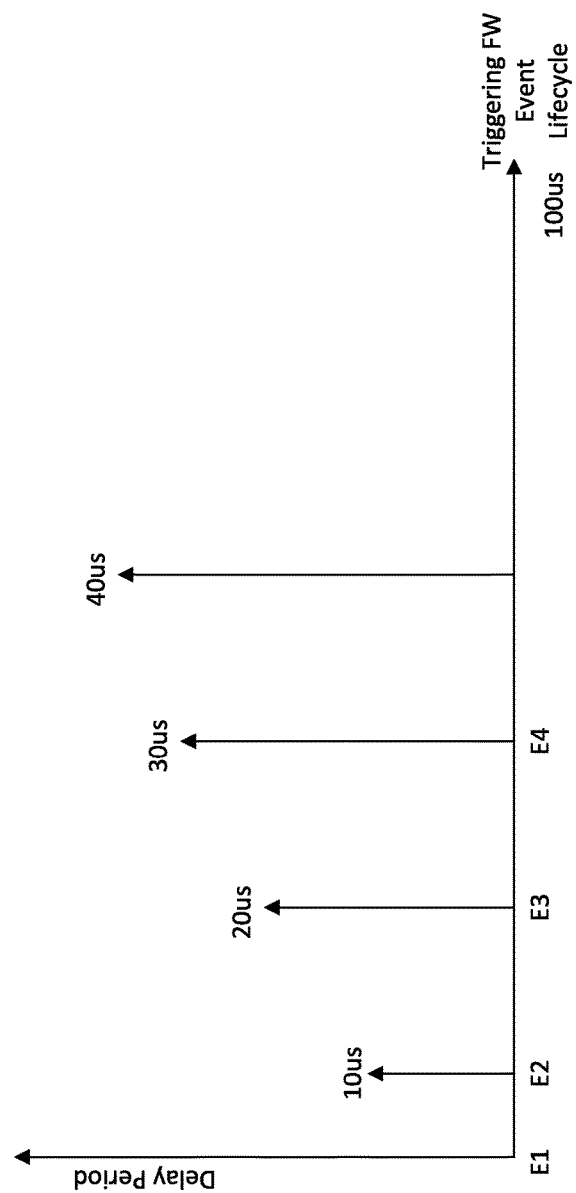
FIG. 2 is a graph illustrating execution of a cross-feature event after different shmoo delay periods during the course of a triggering firmware event, in accordance with one or more embodiments of the present disclosure.

FIG. 2 illustrates a graph 200 of the lifecycle (e.g., completion time) of a triggering FW event versus shmoo delay periods. In the example of FIG. 2, the host may select delay periods that increase by 10 us increments, such that for a triggering FW event that requires 100 us to execute, the storage device 120 may execute the triggering FW event 10 times, with execution of the reset being delayed by 10 us increments in each subsequent execution of the triggering FW event. As shown in FIG. 2, at the first execution of the triggering FW event (E1), the storage device 120 may execute the reset upon detection of the triggering FW event. During the second execution (E2) of the triggering FW event, the storage device 120 may execute the reset after a 10 us delay upon detection of the triggering FW event. During the third execution (E3) of the triggering FW event, the storage device 120 may execute the reset after a 20 us delay upon detection of the triggering FW event. In this manner, the host may obtain test coverage over a broad range of the triggering FW events execution cycle. Stated differently, the host may observe the effect of the reset on various different instructions of the triggering FW event that occur at different times during its execution cycle. The host may set the shmoo delay parameters to deliberately target certain instructions.

Upon configuring the cross feature HW 170 with the reset data, computing device 110 may initiate a test of the storage device 120. More specifically, computing device 110 may transmit a number of NVMe commands such as I/O commands (e.g., read, write, flush, etc.) and/or administrative commands (e.g., create, delete, format, set feature, SQ/CQ, etc.) to the storage device 120 for execution. As storage device 120 begins executing the commands, it may begin generating FW events 180, which it may stream (along with a FW event ID for each FW event 180) to the debug HW 160 via bus 165. A FW event 180 may be any operation that modifies the non-volatile memory 140, such as a user data write operation, certain read operations, a controller data write operation, a statistics operation, or a log operation, for example. As each FW event 180 is received, the debug HW 160 may compare the FW event ID of the received FW event 180 to the triggering FW event ID stored in debug HW 160. Upon detecting a match, the debug HW 160 may identify the FW event 180 having the matching ID as the triggering FW event and transmit an indication that the triggering FW event was detected to the HW 170. The indication may transmitted as a GPIO signal, for example. In the example of FIG. 1B, debug HW 160 may determine a match between the triggering FW event ID and the FW event ID of FW event 180A (i.e. the triggering FW event). The HW 170 may be configured to transmit the reset type, the reset parameters, and the shmoo delay parameters (if any) to the register address of the link control register 120A in response to receiving the GPIO signal. Once the data storage device 120 receives the reset type, the reset parameters, and the shmoo delay parameters (if any) at its link control register 120A, it may execute the reset, while the FW event 180A is executing.

Data storage device 120 may then execute the reset during execution of the FW event 180A (e.g., the triggering FW event). Computing device 110 may observe the operation of the data storage device 120 when deterministically executing the reset command based on occurrence of the triggering FW event (e.g., while the firmware is in a particular state). During the time between detection of a match between the triggering FW event ID and the FW event ID of FW event 180A, only certain initial instructions associated with FW event 180A may have been executed, however the instructions that the reset command are meant to interrupt may occur/complete after these initial instructions. Stated differently, the host may be interested in artifacts and glitches generated as a result of executing a reset during instructions that occur/complete after the initial instructions of the FW event 180A have executed. For example, the host may be interested in interrupting a wordline write, which may require approximately 120-200 milliseconds (ms) to complete. However, the time span between detection of the triggering FW event (e.g., FW event 180A) and execution of the reset by data storage device 120 may be less than 2 ms. Therefore, storage device 120 may execute the reset without missing the triggering FW event. In this way, data storage system 100 may allow for the reproduction and study of real world scenarios related to executing resets while certain FW events are in progress. The data storage system 100 may allow for the injection of resets at a microsecond granularity of FW event detection and can be easily automated for large scale deployment.

In some embodiments, if the shmoo delay parameter has been set, data storage device 120 may execute the triggering FW event 180A multiple times, and for each execution, may delay execution of the reset (cross feature event) by a different time period based on the one or more delay periods set by the host in the shmoo delay parameters, as discussed with respect to FIG. 2.

Figure 1C:
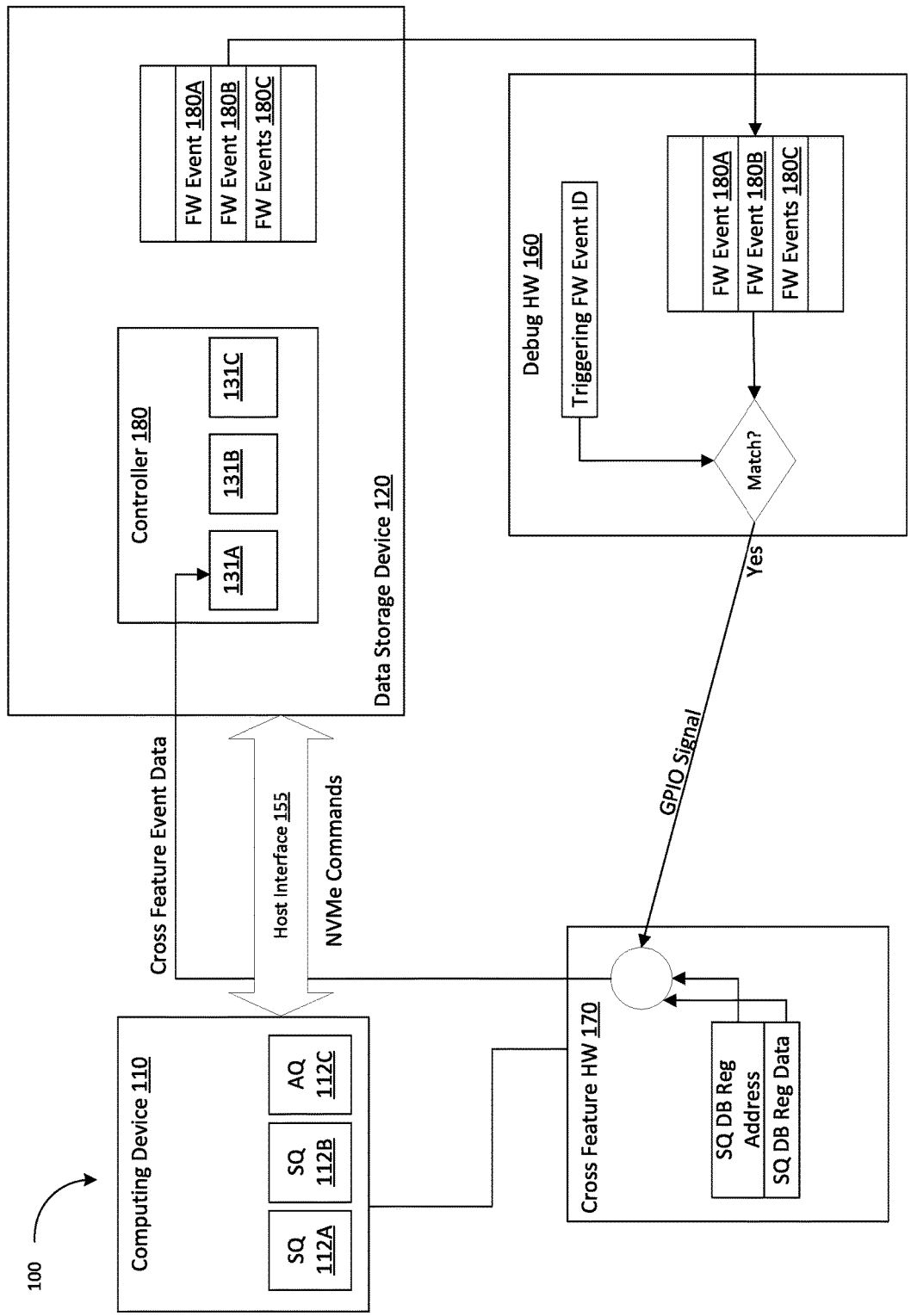
FIG. 1C is a block diagram illustrating the example SSD validation system of FIG. 1A, in accordance with one or more embodiments of the present disclosure.

FIG. 1C illustrates the SSD validation system 100 in accordance with some embodiments of the present disclosure. As discussed above, cross feature injection may also refer to deterministically processing an NVMe command based on the occurrence of a FW event (e.g., while the firmware is in a particular state). This is particularly important for SSD validation as it helps to reproduce and study certain real-world scenarios related to I/O or administrative command behavior while a FW event is in progress. The host may select the cross feature event as either an I/O command or an administrative command based on what test data the host is interested in. For example, the host may be interested in observing operation of the data storage device 120 when executing an I/O command during operation (e.g., while the firmware of the data storage device 120 is in a particular state). The computing device 110 may configure the HW 170 with a register address of a submission queue doorbell register 131 and doorbell register data to write in the doorbell register 131, and may configure the debug HW 160 with the triggering FW event ID. The triggering FW event may be any FW event (e.g., a user data write operation, certain read operations, a controller data write operation) whose execution the host wishes to interrupt with execution of a cross feature event so as to monitor the effects of such interruption.

Computing device 110 may include a submission queue 112A that is dedicated to storing I/O commands, a submission queue 112B dedicated to I/O commands, and an administrative queue 112C, dedicated to administrative commands. Each queue 112 may have its own doorbell register 131 (with a corresponding doorbell register address) on the storage device 120 as well as associated doorbell register data. When the doorbell register data for a queue 112 is written to the corresponding doorbell register 131 (i.e. the doorbell has been rung), the storage device 120 may retrieve a command from the corresponding queue 112 via a direct memory access (DMA) request, for example.

In some embodiments, if the cross feature event is an I/O command, computing device 110 may write the I/O command to the submission queue 112A but may not "ring the doorbell." Computing device 110 may configure the HW 170 with cross feature event data of the I/O command. The cross feature event data of the I/O command may include a register address of the doorbell register 131A and doorbell register data to write in the doorbell register 131A. Doorbell register data may include data to immediately indicate to the controller that there are commands in the queue and trigger an interrupt to controller 130 and create an additional task which will run in parallel to the triggering FW event. Assuming that the triggering FW event is a write event, writing the doorbell register data to submission queue 112A may trigger an interrupt to controller 130 and create an additional task (the cross feature event) which will run in parallel to the write event. This allows the controller 130 to immediately know that there is a new command in the submission queue 112A and the write is disturbed by the new activity initiated by the "doorbell ring." Computing device 110 may also configure the debug HW 160 with the triggering FW event ID and initiate a test of the data storage device (e.g., transfer NVMe commands to data storage device 120 for execution).

In other embodiments, if the cross feature event is an administrative command, computing device 110 may write the administrative command to the administrative queue 112C but may not "ring the doorbell." Computing device 110 may then proceed as discussed above with respect to I/O commands, however computing device 110 may not use other administrative commands as part of the test, as there is only one administrative queue 112C. Therefore, when the cross feature event is an administrative command, it may only interrupt I/O commands (or, more specifically, a triggering FW event thereof) that are in progress by the data storage device 120.

By configuring the HW 170 in this way, the computing device 110 may also put the HW 170 into a GPIO monitoring mode, wherein it will monitor for a GPIO signal, and write the data of the cross feature event into the appropriate doorbell register 131 in response to being triggered by the GPIO signal as discussed in further detail herein. In the example of FIG. 1C, the cross feature event may be an I/O command.

In some embodiments, the host (computing device 110) may wish to observe the effect of an interrupting I/O command at multiple points throughout the execution of the triggering FW event. Thus, the computing device 110 may include as part of the cross feature event data, a shmoo delay parameter, which may be defined as one or more periods (e.g., 10 microseconds (us), 20 us, 30 us) by which execution of the cross feature event may be delayed during the execution of the triggering FW event. Thus, when the shmoo delay parameter is included with the cross feature event data, the storage device 120 may repeat execution of the triggering FW event for each delay period set, each time executing the I/O command during execution of the triggering FW event but after a different delay period. The host may select the delay periods such that a thorough range of test coverage is obtained. The host may accomplish this by selecting the delay periods randomly or in ascending order by particular increments, for example.

FIG. 2 illustrates a graph 200 of the lifecycle (e.g., completion time) of a triggering FW event versus shmoo delay periods. In the example of FIG. 2, the host may select delay periods that increase by 10 us increments, such that for a triggering FW event that requires 100 us to execute, the storage device 120 may execute the triggering FW event 10 times, with execution of the I/O command being delayed by 10 us increments in each subsequent execution of the triggering FW event. As shown in FIG. 2, at the first execution of the triggering FW event (E1), the storage device 120 may execute the I/O command upon detection of the triggering FW event. During the second execution (E2) of the triggering FW event, the storage device 120 may execute the I/O command after a 10 us delay upon detection of the triggering FW event. During the third execution (E3) of the triggering FW event, the storage device 120 may execute the I/O command after a 20 us delay upon detection of the triggering FW event. In this manner, the host may obtain test coverage over a broad range of the triggering FW events execution cycle. Stated differently, the host may observe the effect of the I/O command on various different instructions of the triggering FW event that occur at different times during its execution cycle. The host may set the shmoo delay parameters to deliberately target certain instructions.

Upon configuring the cross feature HW 170 with the cross feature data, computing device 110 may initiate a test of the storage device 120. More specifically, computing device 110 may transmit a number of NVMe commands such as I/O commands (e.g., read, write, flush, etc.) and/or administrative commands (e.g., create, delete, format, set feature, SQ/CQ, etc.) transmitted to the storage device 120 for execution. When the cross feature event is an administrative command, only I/O commands can be transmitted as part of the test, since there is only one administrative command submission queue 112C. As storage device 120 begins executing the commands, it may begin generating FW events 180, which it may stream (along with a FW event ID for each FW event) to the debug HW 160 via high speed bus 165. A FW event may be any operation that modifies the non-volatile memory 140, such as a user data write operation, certain read operations, a controller data write operation, a statistics operation, or a log operation, for example. As each FW event 180 is received, the debug HW 160 may compare the FW event ID of the received FW event 180 to the triggering FW event ID stored in debug HW 160 as discussed herein. Upon detecting a match, the debug HW 160 may transmit a GPIO signal to the cross feature HW 170. In the example of FIG. 1C, debug HW 160 may determine a match between the triggering FW event ID and the FW event ID of FW event 180A. The cross feature HW 170 may be configured to transmit the submission queue doorbell register data to the register address of the doorbell register 131A in response to receiving the GPIO signal. Once the submission queue doorbell register data has been written to the doorbell register 131A, the data storage device 120 may retrieve the I/O command from the SQ 112A of computing device 110 using a DMA request, for example.

Data storage device 120 may then execute the I/O command during execution of the FW event 180A (e.g., the triggering FW event). The host computing device may observe the operation of the data storage device 120 when deterministically executing the I/O command based on occurrence of the triggering FW event 180A (e.g., while the firmware is in a particular state). During the time between detection of a match between the triggering FW event ID and the FW event ID of FW event 180A, only certain initial instructions associated with FW event 180A may have been executed, however the instructions that the reset command are meant to interrupt may occur/complete after these initial instructions. Stated differently, the host may be interested in observing operation of the data storage device 120 when executing the I/O command during instructions that occur/complete after the initial instructions of the FW event 180A have executed. For example, the host may be interested in interrupting a wordline write, which may require approximately 120-200 milliseconds (ms) to complete. However, the time span between detection of the triggering FW event (e.g., FW event 180A) and execution of the reset by data storage device 120 may be less than 2 ms. Therefore, storage device 120 may execute the I/O command without missing the triggering FW event 180A. In this way, validation system 100 may allow for the reproduction and study of real world scenarios related to I/O or administrative command behavior while another FW event is in progress. The data storage system 100 may allow for the injection of the I/O command at a microsecond granularity within detection of FW event 180A and can be easily automated for large scale deployment.

In some embodiments, if the shmoo delay parameter has been set, data storage device 120 may execute the triggering FW event 180A multiple times, and for each execution, may delay execution of the I/O command (cross feature event) by a different time period based on the one or more periods set by the host, as discussed with respect to FIG. 2.

Figure 3A:
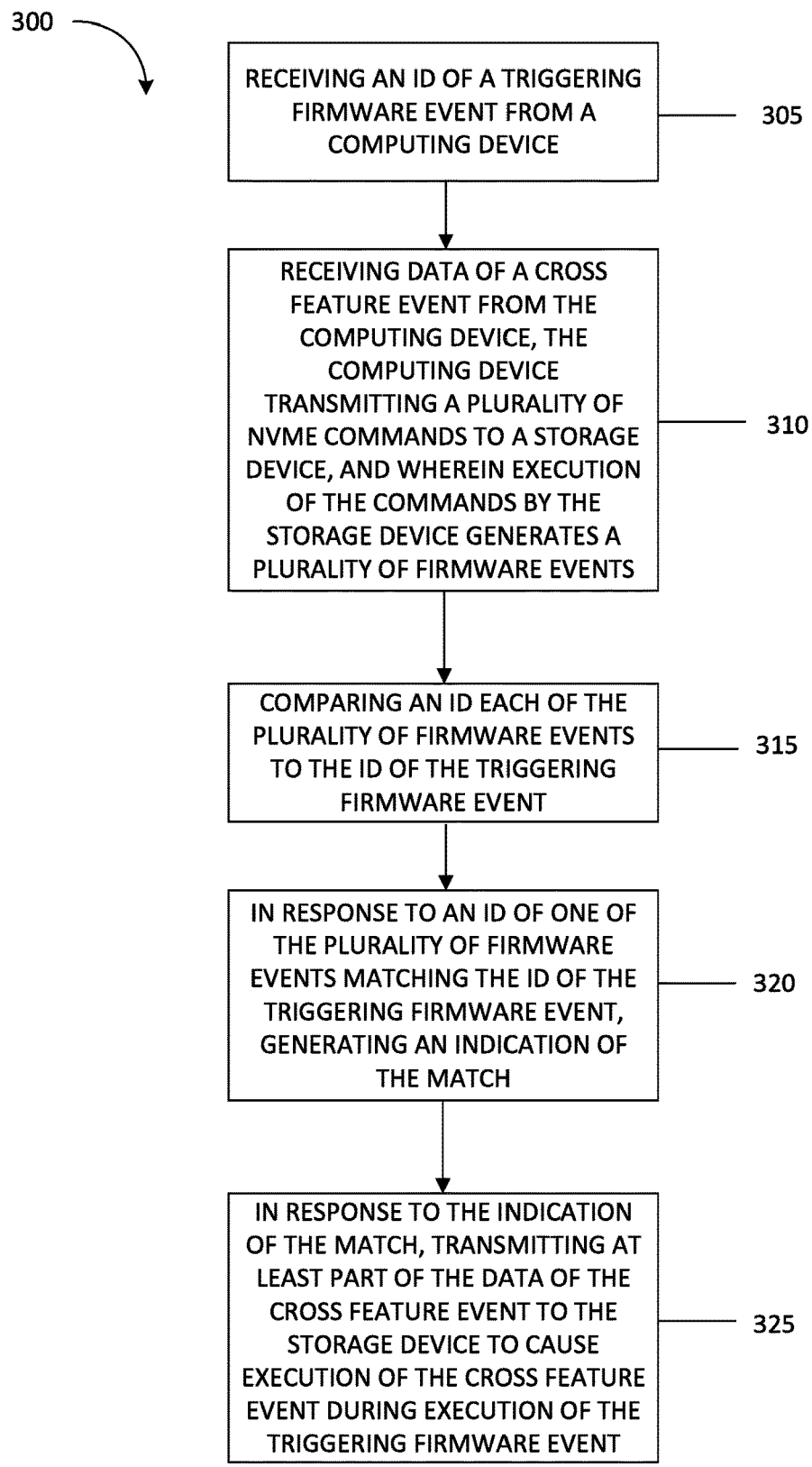
FIG. 3A is a flowchart illustrating an example method for validating an SSD, in accordance with one or more embodiments of the present disclosure.

FIG. 3A is a flowchart illustrating an example method 300 for deterministically validating operation of an SSD, in accordance with some embodiments of the present disclosure. The method 300 may be performed by a processing device (e.g., a processor, a central processing unit (CPU), a controller, an application-specific integrated circuit (ASIC), a field programmable gate array (FPGA), etc.) of one or more computing devices. For example, the method 300 may be performed by one or more computing devices (e.g., HW 170 and debug HW 160), alternatively the method 300 may be performed by a single computing device 190. The controller or processing device may be processing logic that includes hardware (e.g., circuitry, dedicated logic, programmable logic, microcode, etc.), software (e.g., instructions run on a processor to perform hardware simulation), firmware, or a combination thereof.

At block 305, computing device 190 may receive an ID of a triggering firmware event from a host computing device. At block 310, the computing device 190 may receive data of a cross feature event from the host computing device. In some embodiments, the cross feature event may be a reset and the data of the cross feature event may include a reset type, a register address of the link control register 120A, any reset parameters necessary, and (optionally) a shmoo delay parameter. In other embodiments, the cross feature event may be an NVMe command, and the data of the cross feature event may include an address of a submission queue doorbell register 131 and submission queue doorbell register data to write in the doorbell register 131. The host computing device may initiate a test of the data storage device 120 by transmitting a plurality of NVMe commands to the data storage device 120. More specifically, the host computing device may transmit a number of NVMe commands such as I/O commands (e.g., read, write, flush, etc.) and/or administrative commands (e.g., create, delete, format, set feature, SQ/CQ, etc.) to the storage device 120 for execution. As the storage device begins executing the NVMe commands, it may generate a plurality of firmware events.

At block 315, computing device 190 may compare an ID each of the plurality of firmware events to the ID of the triggering firmware event. At block 320, in response to an ID of one of the plurality of firmware events matching the ID of the triggering firmware event, the computing device 190 may generate an indication of the match. At block 325, in response to the indication of the match, the computing device 190 may transmit at least part of the data of the cross feature event to the storage device to cause execution of the cross feature event during execution of the triggering firmware event. In some embodiments, the cross feature event may be a reset, and the HW 170 may be configured to transmit the reset type, the reset parameters, and the shmoo delay parameters (if any) to the register address of the link control register 120A in response to the indication of the match. Once the data storage device 120 receives the reset type, the reset parameters, and the shmoo delay parameters (if any) at its link control register 120A, it may execute the reset, while the FW event 180A (the triggering firmware event) is executing. If the shmoo delay parameter has been set, data storage device 120 may execute the triggering FW event 180A multiple times, and for each execution, may delay execution of the cross feature event by a different time period based on the one or more periods set by the host, as discussed with respect to FIG. 2. Computing device 110 may observe any artifacts or glitches generated as a result of deterministically executing the reset command based on occurrence of the triggering FW event (e.g., while the firmware is in a particular state).

In some embodiments, the cross feature event may be an NVMe command, and the HW 170 may be configured to transmit the submission queue doorbell register data to the doorbell register 131A in response to the indication. Once the submission queue doorbell register data has been written to the doorbell register 131, the data storage device 120 may retrieve the NVMe command from the queue 112 of computing device 110 using a DMA request, for example.

Data storage device 120 may then execute the NVMe command during execution of the FW event 180A (e.g., the triggering FW event). The host computing device may observe the operation of the data storage device 120 when deterministically executing the I/O command based on occurrence of the triggering FW event (e.g., while the firmware is in a particular state).

Figure 3B:
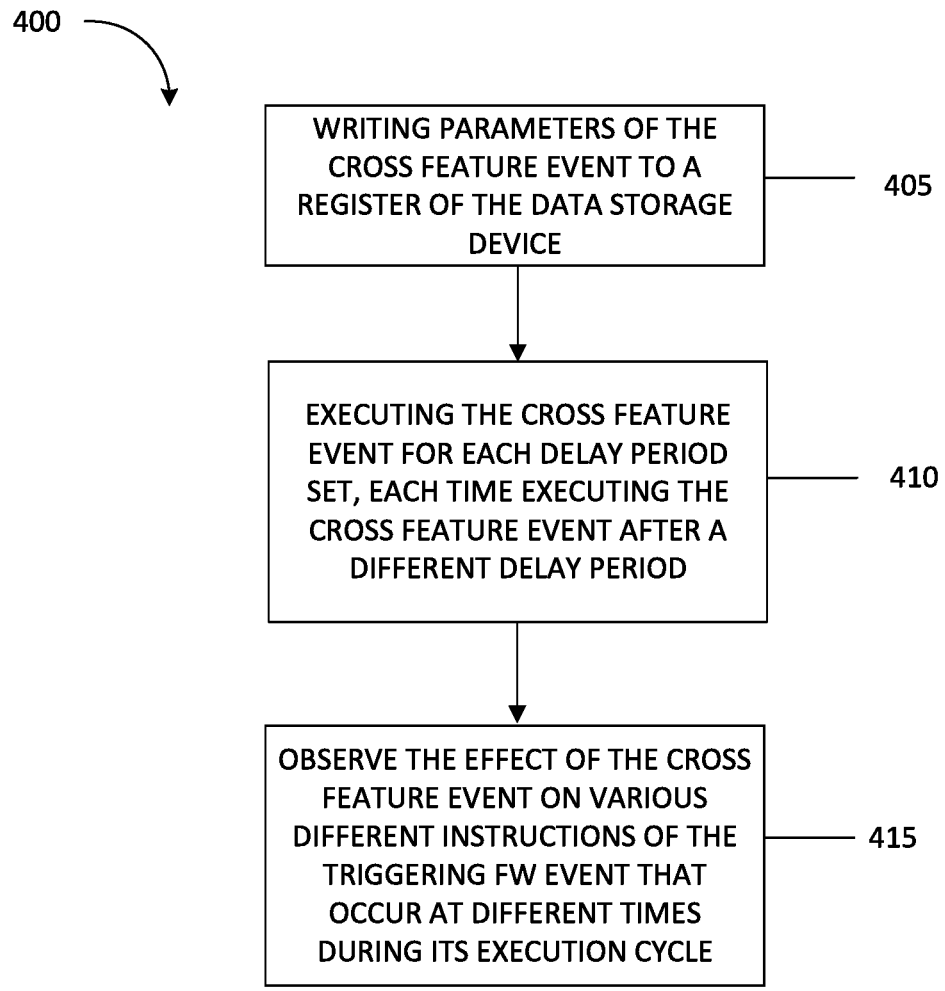
FIG. 3B is a flowchart illustrating an example method for validating an SSD, in accordance with one or more embodiments of the present disclosure.

FIG. 3B is a flowchart illustrating an example method 400 for deterministically validating operation of an SSD using shmoo delay periods, in accordance with some embodiments of the present disclosure. The method 400 may be performed by a processing device (e.g., a processor, a central processing unit (CPU), a controller, an application-specific integrated circuit (ASIC), a field programmable gate array (FPGA), etc.) of one or more computing devices. For example, the method 400 may be performed by one or more computing devices (e.g., computing device 190 and storage device 120). The controller or processing device may be processing logic that includes hardware (e.g., circuitry, dedicated logic, programmable logic, microcode, etc.), software (e.g., instructions run on a processor to perform hardware simulation), firmware, or a combination thereof.

In some embodiments, the host (computing device 110) may wish to observe the effect of a sudden reset at multiple points throughout the execution of the triggering FW event. Thus, the computing device 110 may include as part of the cross feature event data, a shmoo delay parameter, which may be defined as one or more periods (e.g., 10 microseconds (us), 20 us, 30 us) by which execution of the cross feature event may be delayed during the execution of the triggering FW event. At block 405, the computing device 109 may write the parameters of the cross feature event, including the shmoo delay parameters to the data storage device 120. At block 410, the storage device 120 may execute the triggering FW event for each delay period set, each time executing the cross feature event after a different delay period. The host may select the delay periods such that a thorough range of test coverage is obtained. The host may accomplish this by selecting the delay periods randomly or in ascending order by particular increments, for example. At block 415, the host may observe the effect of the cross feature event on various different instructions of the triggering FW event that occur at different times during its execution cycle obtain. In this way, the host may obtain test coverage over a broad range of the triggering FW events execution cycle. Stated differently, the host may observe the effect of executing the cross feature events on various different instructions of the triggering FW event that occur at different times during its execution cycle.

Figure 4:
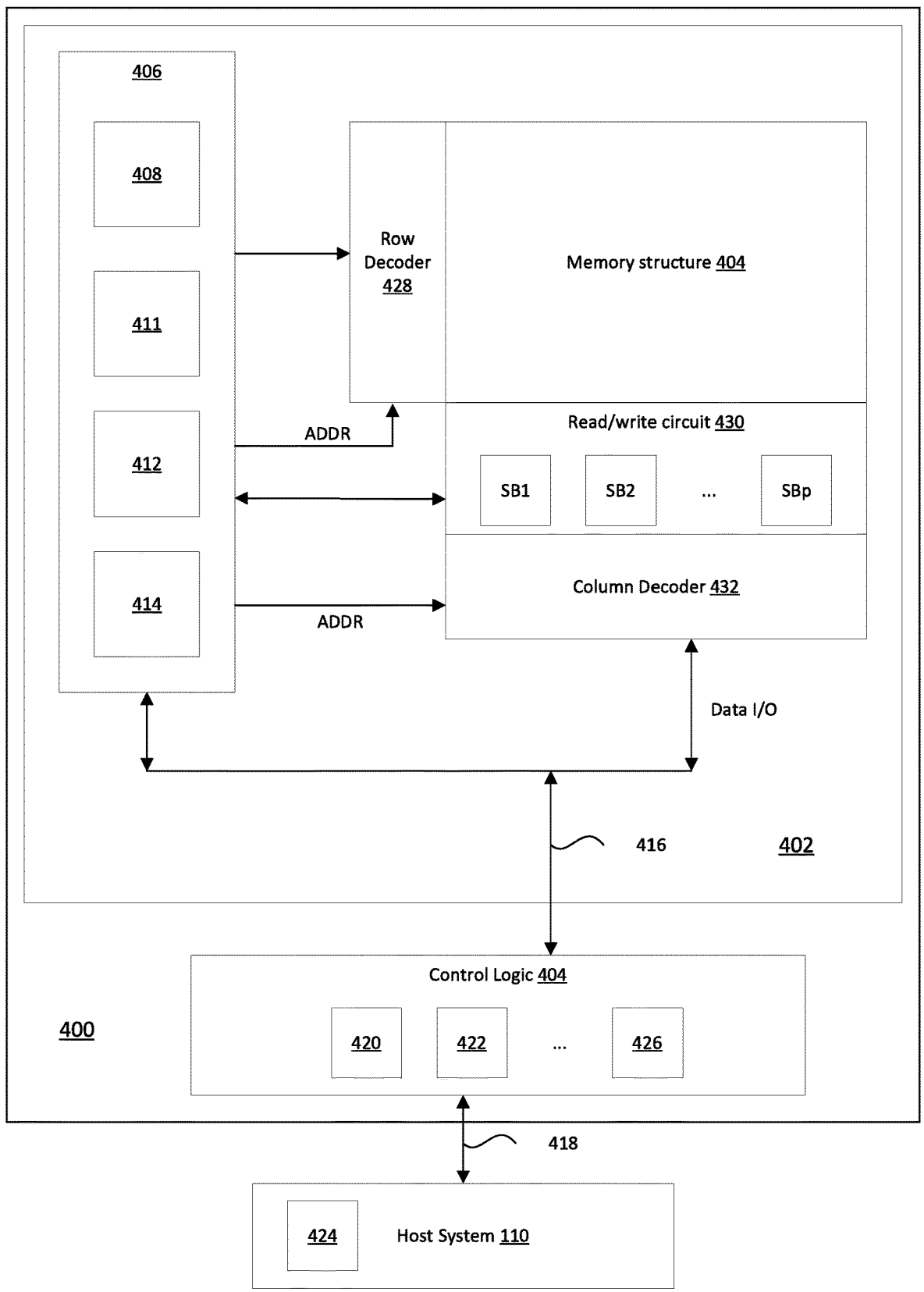
FIG. 4 is a block diagram of a non-volatile data storage system, in accordance with one or more embodiments of the present disclosure.

FIG. 4 is a block diagram of an exemplary non-volatile data storage system 400, which may be an example of the data storage device 120 illustrated in FIGS. 1A-1C. The non-volatile data storage system 400 may include one or more memory die 402. The memory die 402 includes a memory structure 404 of memory cells, such as an array of memory cells herein referred to as a memory array, address controller 406, and read/write circuits 430. The memory structure 404 is addressable by word lines via a row decoder 428 and by bit lines via a column decoder 432. The read/write circuits 430 include multiple sense blocks SB1, SB2, . . . , SBp (sensing circuitry) and allow a page of memory cells to be read or programmed in parallel. Typically, the memory system-based control logic 404 is included in the same non-volatile memory system 400 (e.g., a removable storage card) as the one or more memory die 402. Control commands and data (e.g., a raw video stream) are transferred between the host system 110 (e.g., computing device 110 of FIG. 1A) and memory system-based control logic 404 via a data bus 418, and between the controller and the one or more memory die 402 via lines 416. The data bus 418 may for example be a PCIe serial memory bus.

The memory structure 404 can be 2D (laid out in a single fabrication plane) or 3D (laid out in multiple fabrication planes). The memory structure 404 may comprise one or more array of memory cells including a 3D array. In one embodiment, the memory structure 404 may comprise a monolithic three-dimensional memory structure (3D array) in which multiple memory levels are formed above (and not in) a single substrate, such as a wafer, with no intervening substrates. The memory structure 404 may comprise any type of non-volatile memory that is monolithically formed in one or more physical levels of arrays of memory cells having an active area disposed above a silicon substrate. The memory structure 404 may be in a non-volatile memory device (e.g., non-volatile data storage system 400) having circuitry associated with the operation of the memory cells, whether the associated circuitry is above or within the substrate.

The address controller 406 cooperates with the read/write circuits 430 to perform memory operations on memory cells of the memory structure 404, and includes a state machine 408, an address decoder 411, and a power control 414. The state machine 408 provides control of memory operations. A store region selector 412 may be provided, e.g., for programming parameters as described further below.

The address decoder 410 provides an address interface between that used by the host or a memory system-based control logic 404 to the hardware address used by the row decoder 428 and column decoder 432. The power control 414 controls the power and voltages supplied to the various control lines during memory operations. The power control 414 and/or read/write circuits 430 can include drivers for word lines, source gate select (SGS) transistors, drain gate select (DGS) transistors, bit lines, substrates (in 2D memory structures), charge pumps, and source lines. The sense blocks can include bit line drivers and sense amplifiers in one approach.

An SGS transistor is a select gate transistor at a source end of a memory string, and a DGS transistor is a select gate transistor at a drain end of a memory string.

In some implementations, some of the components can be combined. In various designs, one or more of the components (alone or in combination), other than memory structure 404, can be thought of as at least one control circuit or controller which is configured to perform the techniques described herein. For example, a control circuit may include any one of, or a combination of, address controller 406, state machine 408, address decoder 410, column decoder 432, power control 414, control processor 426, sense blocks SB1, SB2, . . . , SBp, read/write circuits 430, memory system-based control logic 404, and so forth.

The memory system-based control logic 404 may comprise a control processor 426 and memory devices such as controller read-only memory 420 and controller volatile memory 422.

The memory devices of the memory system-based control logic 404 may comprise code such as a set of instructions that configure the control processor 426 to execute the set of instructions to provide aspects of the functionality described herein. Alternatively, or additionally, the control processor 426 can access code from the memory structure 404, such as a reserved area of memory cells in one or more word lines.

For example, code can be used by the memory system-based control logic 404 to access the memory structure 404, controller read-only memory 420, or controller volatile memory 422 for partial decoding and/or event detection logic. In some embodiments the control logic may utilize the host system volatile memory 424 for caching some or all of the raw video stream for partial decoding and event detection, using for example direct memory access technology (DMA) over the data bus 418. The control logic may further include drivers to perform basic tasks such as controlling and allocating memory, prioritizing the processing of instructions, and controlling input and output ports.

Generally, the control logic can include software and other logic (e.g., circuits, firmware) to perform the functions described herein. The control logic may comprise a sequencer to control the timing (start and stop times, durations, spacing etc.) of the various signals described herein. The state machine 408 may also be utilized to implement aspects of the control logic.

In one embodiment, the host system 110 is a computing device (e.g., laptop, desktop, smartphone, tablet, digital camera) that includes one or more processors, one or more processor readable storage devices (host system volatile memory 424, ROM, flash memory, hard disk drive, solid state memory) that store processor readable code (e.g., software) for programming the one or more processors to perform aspects of the techniques described herein. The host system 110 may also include additional system memory, one or more input/output interfaces and/or one or more input/output devices in communication with the one or more processors, as well as other components well known in the art.

The store region selector 412 may be a non-volatile memory such as NAND flash memory, or another type. The store region selector 412 identifies blocks of the memory structure 404 for reading and writing, among other things, as known in the art.

One of skill in the art will recognize that the non-volatile memory system 400 is an example and that various implementations will include additional components, or exclude or combine some of the illustrated components, in manners known in the art.

GENERAL COMMENTS

Those skilled in the art will appreciate that in some embodiments, other types of distributed data storage systems may be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A method comprising:
    receiving an ID of a triggering firmware event from a computing device;
    receiving data of a cross feature event from the computing device, the computing device transmitting a plurality of NVMe commands to a storage device, and wherein execution of the plurality of NVMe commands by the storage device generates a plurality of firmware events;
    comparing an ID of each of the plurality of firmware events to the ID of the triggering firmware event;
    in response to an ID of one of the plurality of firmware events matching the ID of the triggering firmware event, identifying the one of the plurality of firmware events as the triggering firmware event and generating an indication of a match; and
    in response to the indication of the match, transmitting at least part of the data of the cross feature event to the storage device to cause execution of the cross feature event during execution of the triggering firmware event.

2. The method of claim 1, wherein the cross feature event is a reset, and data of the reset includes a reset type, reset parameters, and an address of a register on the storage device where at least part of the data of the reset is to be transmitted.

3. The method of claim 2, wherein transmitting the at least part of the data of the reset comprises transmitting the reset parameters to the register on the storage device.

4. The method of claim 2, wherein the data of the reset further includes a shmoo delay parameter indicating one or more time periods by which execution of the cross feature event is to be delayed by the storage device during execution of the triggering firmware event.

5. The method of claim 1, further comprising monitoring artifacts and glitches caused by execution of the cross feature event during the triggering firmware event.

6. The method of claim 1, wherein the cross feature event is an NVMe command stored in a submission queue of the computing device, and data of the NVMe command includes an address of a doorbell register of the storage device and parameters of the NVMe command.

7. The method of claim 6, wherein transmitting the at least part of the data of the cross feature event comprises writing the parameters of the NVMe command to the doorbell register of the storage device, to cause the storage device to retrieve the NVMe command from the submission queue of the computing device and execute the NVMe command.

8. The method of claim 1, wherein the plurality of NVMe commands includes input/output (I/O) commands and administrative commands.

9. The method of claim 1, wherein the match between the ID of one of the plurality of firmware events and the ID of the triggering firmware event is indicated by a general purpose input/output (GPIO) signal.

10. The method of claim 6, further comprising monitoring behavior of at least one of the plurality of NVMe commands during execution of the triggering firmware event.

11. An apparatus comprising:
a first interface to communicate with a computing device;
a second interface to communicate with a storage device; and
a processing device to:
receive an ID of a triggering firmware event from the computing device;
receive data of a cross feature event from the computing device, the computing device transmitting a plurality of NVMe commands to the storage device, and wherein execution of the commands by the storage device generates a plurality of firmware events;
compare an ID of each of the plurality of firmware events to the ID of the triggering firmware event;
in response to an ID of one of the plurality of firmware events matching the ID of the triggering firmware event, identify one of the plurality of firmware events as the triggering firmware event and generate an indication of a match; and
in response to the indication of the match, transmit at least part of the data of the cross feature event to the storage device to cause execution of the cross feature event during execution of the triggering firmware event.

12. The apparatus of claim 11, wherein the cross feature event is a reset, and the data of the reset includes a reset type, reset parameters, and an address of a register on the storage device where at least part of the data of the reset is to be transmitted.

13. The apparatus of claim 12, wherein to transmit at least part of the data of the reset, the processing device is to write the reset parameters to the register on the storage device.

14. The apparatus of claim 12, wherein the data of the reset further includes a shmoo delay parameter indicating one or more time periods by which execution of the cross feature event is to be delayed by the storage device during execution of the triggering firmware event.

15. The apparatus of claim 11, wherein the processing device is further configured to monitor artifacts and glitches caused by execution of the cross feature event during the triggering firmware event.

16. The apparatus of claim 11, wherein the cross feature event is an NVMe command stored in a submission queue of the computing device, and data of the NVMe command includes an address of a doorbell register of the storage device and parameters of the NVMe command.

17. The apparatus of claim 16, wherein to transmit at least part of the data of the cross feature event, the processing device is to write the parameters of the NVMe command to the doorbell register of the storage device, to cause the storage device to retrieve the NVMe command from the submission queue of the computing device and execute the NVMe command.

18. The apparatus of claim 11, wherein the plurality of NVMe commands includes input/output (I/O) commands and administrative commands.

19. The apparatus of claim 11, wherein to generate the indication of the match, the processing device generates a general purpose input/output (GPIO) signal indicating the match.

20. A non-transitory computer readable medium, having instructions stored thereon that, when executed by a processing device, cause the processing device to:
receive an ID of a triggering firmware event from a computing device;
receive data of a cross feature event from the computing device, the computing device transmitting a plurality of NVMe commands to a storage device, and wherein execution of the plurality of NVMe commands by the storage device generates a plurality of firmware events;
compare an ID of each of the plurality of firmware events to the ID of the triggering firmware event;
in response to an ID of one of the plurality of firmware events matching the ID of the triggering firmware event, identify the one of the plurality of firmware events as the triggering firmware event and generate an indication of a match; and
in response to the indication of the match, transmit at least part of the data of the cross feature event to the storage device to cause execution of the cross feature event during execution of the triggering firmware event.

* * * * *